July 26, 1938.  L. A. SHREWSBURY  2,125,204
STAKE AND PULLING AND DRIVING MEANS THEREFOR
Filed April 3, 1937  2 Sheets-Sheet 1
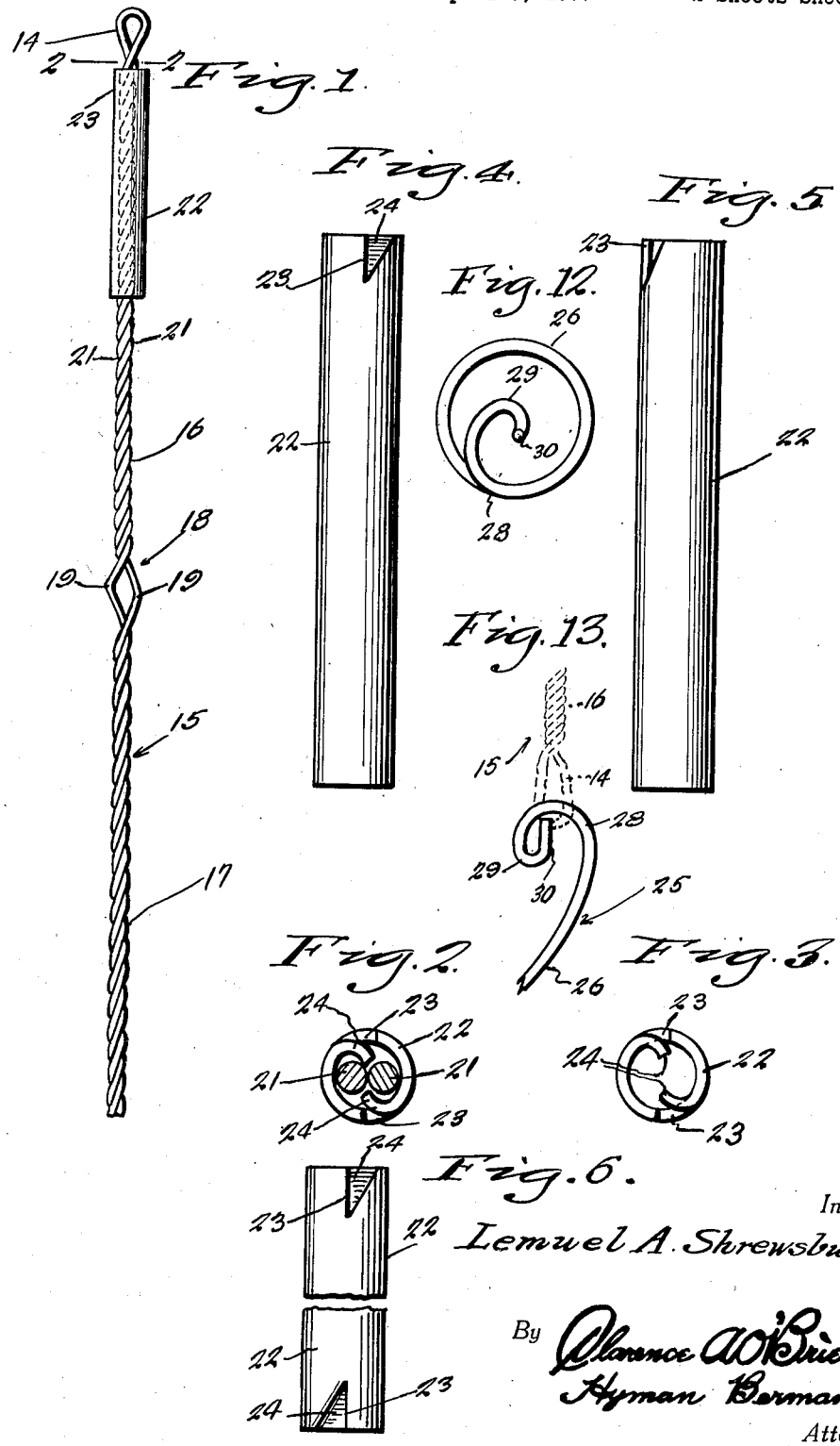
Inventor
Lemuel A. Shrewsbury
By Clarence A. O'Brien
Hyman Berman
Attorneys July 26, 1938.   L. A. SHREWSBURY   2,125,204
STAKE AND PULLING AND DRIVING MEANS THEREFOR
Filed April 3, 1937   2 Sheets-Sheet 2
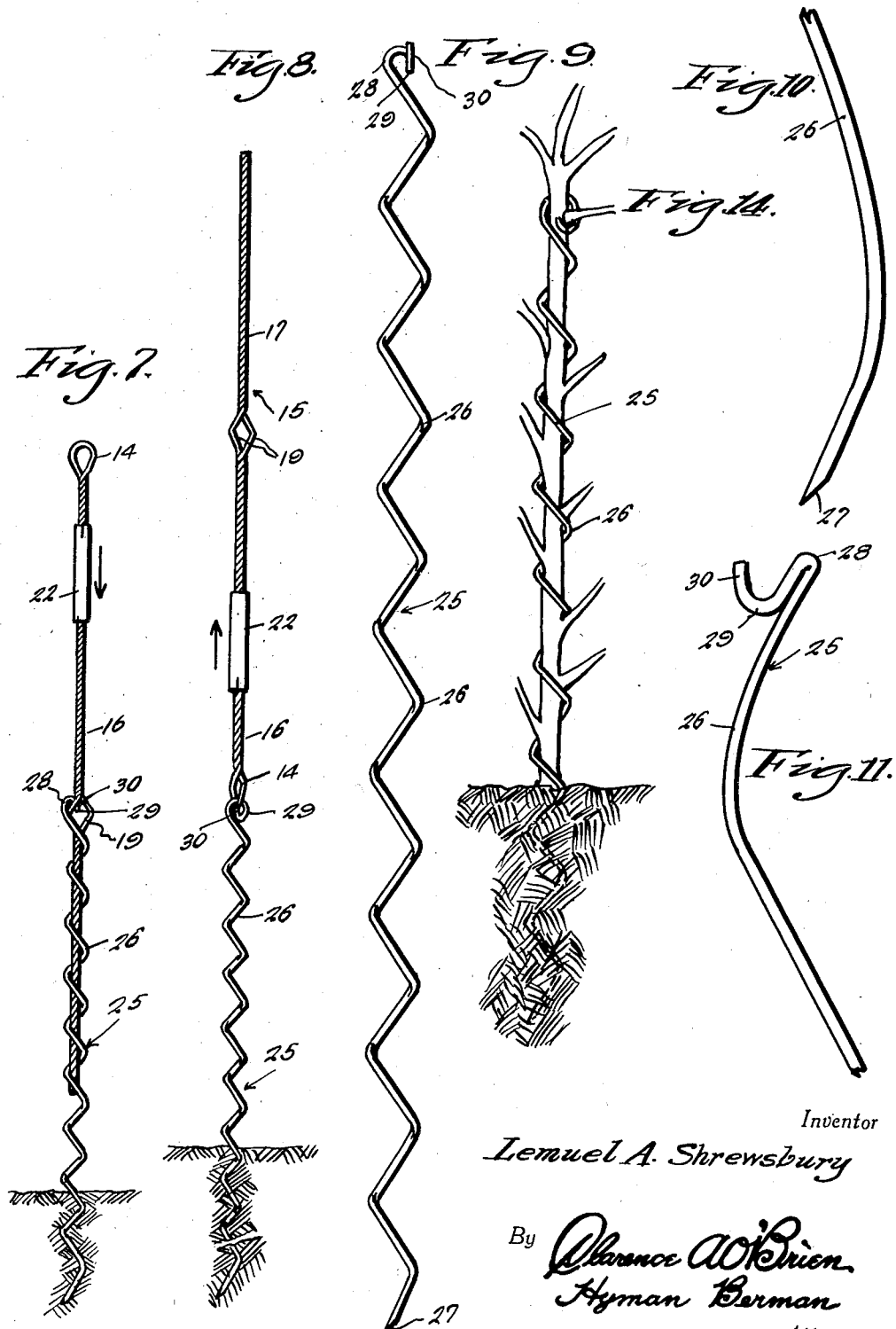
Inventor
Lemuel A. Shrewsbury
By Clarence A. O'Brien
Hyman Berman
Attorneys Patented July 26, 1938

2,125,204

UNITED STATES PATENT OFFICE 2,125,204

STAKE AND PULLING AND DRIVING MEANS THEREFOR

Lemuel A. Shrewsbury, Hamilton, Mo., assignor of one-half to Artie E. McCrary, St. Joseph, Mo.

Application April 3, 1937, Serial No. 134,854

3 Claims. (Cl. 47—47)

This invention relates to that class of agricultural and farm appliances and accessories embracing such articles as plant and vine supports and props, stakes and analogous devices to promote satisfactory growth of tomato plants and the like.

At the present time in this line of endeavor many makeshift devices have been utilized for the purpose. Ordinarily, however, wooden sticks, stakes, and the like, are employed and the climbing plant is tied or otherwise similarly attached thereto. These wooden props are not only cumbersome and susceptible of easy breakage and rotting, but it is difficult to drive the same into the ground, especially when it is dry and hard.

Aggravated by the present prevailing conditions, I have, therefore, evolved and produced what I believe to be an innovation in this particular field of invention, wherein an all-metal spiral stake is utilized, this being constructed to properly embrace and support the growing plant, and further constructed to permit coordination therewith of a unique implement or tool constituting a puller and driver, whereby to facilitate anchoring and subsequent withdrawal of the stake.

More specifically, in reducing the principles of the inventive conception to practice, I have evolved a combination arrangement of units wherein one is in the nature of a spiral auger especially constructed and aptly fitted for the purposes intended, and characterized at its upper end by unique means to facilitate separable driving connection of the puller and driver implement or tool.

Furthermore, novelty is predicated upon the tool separately and in combination with the stake, said tool being characterized by a twisted wire shank, said shank having a reciprocatory operating sleeve thereon, and being fashioned at requisite points for separable coaction with the jointing and operating means on the upper end of the stake.

Other features and advantages will become more readily apparent from the following description and drawings.

In the drawings:

Figure 1 is an elevational view of the stake puller and driver tool or implement, the operating sleeve being shown at the top in readiness for a downward thrust turning action.

Figure 2 is a horizontal section which may be said to be taken on the plane of the line 2—2 of Figure 1.

Figure 3 is a top plan view of the especially constructed simple type hand-gripping and feed screw turning sleeve.

Figure 4 is an elevational view of the sleeve depicted in Figure 3.

Figure 5 is a view at right angles to Figure 4.

Figure 6 is a fragmentary view showing a double acting tooth arrangement wherein the actuating teeth or prongs are at upper and lower ends of the sleeve.

Figure 7 is a view showing the manner in which the driver is temporarily hitched to the stake to imbed the stake in the ground.

Figure 8 is a view showing the same tool inverted and operatively connected with the upper end of the stake to remove it, that is, twirl it out of the ground.

Figure 9 is a detail elevational view of the auger-type stake shown in Figures 7 and 8.

Figure 10 is a fragmentary detail view of the lower pointed end of said stake.

Figure 11 is a detailing view of the upper especially fashioned or bent end of said stake.

Figure 12 is a top view of Figure 9, the view being sufficiently enlarged to portray with requisite nicety the configuration at this end.

Figure 13 is a fragmentary view partly in dotted lines and partly in full lines, the view being based on Figure 8 to show how the tool is engaged with the upper end of the stake to unscrew and remove it from the ground.

Figure 14 is an elevational view illustrating how the stake coacts with and supports a tomato stalk or similar plant.

As a matter of convenience, the tool shown in Figures 1 to 6, inclusive, will be described first. As indicated, it is fashioned from a single length of wire bent between its ends with the bent portion defining what may be called a top loop at 14. Then the respective wires are twisted around each other to form the shank portion 15, which shank portion may be described as including an upper portion 16 constituting the feed screw, and a lower portion 17 constituting the stake pilot and stabilizing element. That portion denoted by the numeral 18 and constituting the juncture between the two features 16 and 17 forms a stake engaging hitch or driving clutch. During the wire twisting process a spreader (not shown) is placed between the wires at this point converting the features into substantially V-shaped portions 19. These cooperate in providing a substantially diamond-shaped eye aptly fitted for the purposes to be hereinafter described. The intertwined or wrapped convolutions in the shank 16 function as screw-threads, as indicated at 21, and these threads serve to accommodate the coacting elements on the reciprocatory rotatable sleeve 22. This sleeve comprises a simple tube of metal having notches 23 formed therein and the metal is bent out of the notch and inwardly to form a substantially V-shaped tooth or lug 24. By preference, as shown in Figures 2 and 3, notches are formed at diametrically opposite points and there are therefore diametrically opposite teeth 24 to engage the threads 21. In some instances it is desirable to have the teeth only at the top, as shown for example in Figures 2, 3, 4, and 5. In other instances it is desirable to have teeth at the bottom, as shown in Figure 6. This is, however, an incidental feature of the invention. The main idea is to have the sleeve threadedly connected with the twisted wire feed screw or shank 16 through the instrumentality of teeth or driving lugs preferably struck out from the simple metal tube.

A glance at Figure 9 showing the stake or prop 25 impresses the observer that it is in the nature of an elongated corkscrew. It is believed to be more satisfactory to describe it as an auger-type stake, since it is formed from a single length of metal fashioned longitudinally into spiral coils or convolutions 26. The lower end is suitably offset and tapered as at 27 to provide a ground penetrating point. The upper end of the stake is especially bent for two purposes. First, it is so made as to accommodate the operating connections 18 and 14 shown in Figure 1. Secondly, it is fashioned to permit it to function as a sort of a stirrup and to allow the upper end of the plant or vine to be draped or hung therein (see Figure 14) to overcome the necessity of tying, as is required with a wooden stake or stick. Specifically, the uppermost convolution is directed radially and inward at the point 28 to form a sort of a return bend. Then the terminal of the wire is fashioned into a U-shaped portion having a seat or keeper as at 29 and a terminal hook at 30. These features 29 and 30 are centrally or axially arranged over central portion of the coiled shank of the stake. This is brought out to advantage in Figure 11.

In operation, the stabilizing and pilot member 17 of the screw is inserted centrally and downwardly through the coils or convolutions of the stake 25 as shown in Figure 7. Then the driving hitch or clutch 18 has its features 19 placed in the seat 29 and held against displacement by the hook 30. Assuming that the rotating sleeve is then at the upper end of the feed screw 16, it is obvious that by grasping and pushing it downwardly in the direction of the arrow seen in Figure 7, this turns the complete tool and also rotates the stake in unison therewith. In so doing, the lower convolutions of the stake enter the ground and imbed themselves therein in an obvious manner.

When it is desired to remove the stake, the tool is turned upside down (see Figures 8 and 13), so to speak, and the loop 14 is engaged with the attaching means 28, 29, and 30. That is to say, the loop is slipped over the features 30 and 29 and hooked under the return bend 28. By moving the sleeve 22 upwardly and at the same time lifting on the tool, this twirls the stake out of the ground in an evident manner.

The driver is essential to the use of the convolved type stake as is evident. That is to say, the companionate association is such that the tool is indispensable to the proper insertion and removal of the stake. The stake itself is lighter in weight and less cumbersome than wooded sticks and makeshift devices now used. No strings are required for tying. The stake can be put in the ground when it is dry, whereas wooden stakes could not be utilized at that time. A metal spiral-type stake of this type makes pruning easier. It promotes convenience in storage and is altogether aptly fitted for the purposes intended. It is unnecessary, however, to delve at length into the commercial aspects of the invention, for the novelty is predicated upon the construction.

It is thought that the description taken in connection with the drawings will enable a clear understanding of the invention to be had. Therefore, a more lengthly description is thought unnecessary.

While the preferred embodiment of the invention has been shown and described, it is to be understood that minor changes coming within the field of invention claimed may be resorted to if desired.

I claim:

1. In a structural assemblage of the class described, an auger including spiral open convolutions, and having central axially arranged tool accommodation and connector means at its top, a tool having hitch means connected with said connector means, said tool including a shank extending down through the convolutions to function as a stabilizing and guide member, said tool further including a feed screw, and a slidable rotary sleeve threaded thereon.

2. As a component part of a structural assemblage of the class described, a driver and puller comprising a single length of wire bent upon itself intermediate its ends into a series of progressive convolutions twisted about each other to provide a longitudinally elongated shank, the shank at its upper end being formed into a loop, the intermediate portion thereof being formed into a similar loop, that portion between the first-named loop and second-named loop constituting a feed screw, that portion beyond the second-named loop constituting a stabilizing and pilot element, and a sleeve slidable on said feed screw and including teeth engageable with the thread forming convolutions thereof.

3. A device of the class described comprising an auger of convolved formation from end to end, the spiral convolutions being open, the lower end being pointed to penetrate the ground, the upper end including a radially and downwardly inturned curl and said curl terminating in a substantially U-shaped vertically disposed member, said U-shaped member being in axial alignment with the longitudinal axis of the auger, and a complemental driver and puller unit separably associated with said auger, said unit being provided at its upper end with a loop selectively engageable with the aforementioned inturned curl, said unit embodying a substantially rigid longitudinally elongated shank, the intermediate portion thereof being formed into a loop for driving clutch connection with said U-shaped member, that portion of the shank between the loops constituting a feed screw and being threaded and provided with operating means, that portion beyond the clutch loop constituting a stabilizing and pilot element and depending, when in use, through the upper and intermediate convolutions of the auger.

LEMUEL A. SHREWSBURY.